United States Patent [19]
Cadaret et al.

[11] Patent Number: 5,484,041
[45] Date of Patent: Jan. 16, 1996

[54] COMPOSITE BRAKE PISTON WITH INTERNAL CUSHION AND STOP

[75] Inventors: Patrick M. Cadaret, Waterford, Mich.; Joseph F. Dernovshek, Rock Hill, S.C.

[73] Assignee: Rockwell International Corporation, Pittsburgh, Pa.

[21] Appl. No.: 447,286

[22] Filed: May 22, 1995

Related U.S. Application Data

[63] Continuation of Ser. No. 120,100, Sep. 10, 1993, abandoned.

[51] Int. Cl.⁶ ............................................ F16D 65/38
[52] U.S. Cl. .............................. 188/73.37; 188/72.4
[58] Field of Search .......................... 188/72.4, 73.35, 188/73.36, 73.37, 73.38

[56] References Cited

U.S. PATENT DOCUMENTS

| | | | |
|---|---|---|---|
| 1,298,178 | 11/1921 | DeLukacsevics et al. | |
| 3,152,523 | 8/1962 | Whitfield et al. | 92/213 |
| 3,398,222 | 8/1968 | Kaufman et al. | 264/250 |
| 3,497,038 | 2/1970 | Schrader et al. | 188/370 |
| 3,528,301 | 9/1970 | Wasmer | 74/18.2 |
| 3,612,409 | 10/1971 | Henning | 239/602 |
| 3,722,634 | 3/1973 | Ogasawara et al. | 188/73.37 |
| 3,730,570 | 5/1973 | Brochstein | 239/602 |
| 3,876,042 | 4/1975 | Borjesson | 188/73.37 |
| 3,890,884 | 6/1975 | Silberschlag | 188/72.4 |
| 4,042,072 | 8/1977 | Baba | 188/71.8 |
| 4,098,951 | 7/1978 | Wolf | 188/73.35 |
| 4,170,925 | 10/1979 | Katz et al. | 91/400 |
| 4,186,824 | 2/1980 | Preston et al. | 188/73.5 |
| 4,203,354 | 5/1980 | Cunningham et al. | 92/169 |
| 4,327,820 | 5/1982 | Nakayama et al. | 188/370 |
| 4,401,012 | 8/1983 | Emmett | 92/248 |
| 4,449,447 | 5/1984 | Yanagi | 92/248 |
| 4,603,760 | 8/1986 | Myers | 188/73.37 |
| 4,928,579 | 5/1990 | Emmett | 92/248 |

FOREIGN PATENT DOCUMENTS

| | | | |
|---|---|---|---|
| 0087876 | 9/1983 | European Pat. Off. | 188/72.4 |
| 2574507 | 6/1986 | France | 188/73.37 |
| 0062773 | 4/1984 | Japan . | |
| 0002028 | 1/1987 | Japan . | |
| 0815379 | 3/1981 | U.S.S.R. . | |

*Primary Examiner*—Matthew C. Graham

[57] ABSTRACT

A brake system having a caliper which defines a bore for slideably receiving a piston. The piston defines a hydraulic chamber at one end and generates a force in response to hydraulic pressure applied thereto. This force is then transmitted through the piston to a backing plate of a brake pad. The brake pad engages a rotor to retard rotation thereof. The piston is constructed as a vessel having a continuous circuit of sides which have an overall axial dimension. A first end of the circuit of sides is open, whereas the second end is closed defining a closed bore. The closed bore is filled with a plastic material which is bonded to the bore by the adhesive properties of the interface existing therebetween. The plastic material features a lower modulus of elasticity than that of the vessel in which it is molded. In addition, the plastic material extends axially beyond the axial dimension of the circuit of sides a predetermined dimension which is equal to the amount of deflection which occurs upon the piston transmitting a first range of forces. Upon reaching the limit of deflection of the predetermined dimension, the continuous circuit of sides engages the brake backing plate, and the combination of the continuous circuit of sides and the plastic material then conjunctively cooperate to transmit a second range of forces through the piston.

12 Claims, 2 Drawing Sheets

COMPOSITE BRAKE PISTON WITH INTERNAL CUSHION AND STOP

This application is a continuation of 08/120,100, filed Sep. 10, 1993, now abandoned.

BACKGROUND OF THE INVENTION

1. Field of the Invention

The present invention relates to pistons for disc brakes, and more particularly to a piston which provides a first modulus of elastic deflection throughout a first range of force transmission and a second higher modulus of elastic deflection for a second range of force transmission therethrough.

2. Description of the Related Art

The use of disc brakes in motor vehicles has become extensive. Pistons for reciprocation in calipers of motor vehicle disc brakes have been fabricated from a range of materials including steel and, more recently, plastic (polymeric) materials such as phenolic resin molding compound. Such pistons may be produced by molding techniques known in the art. Typical plastic pistons are described in U.S. Pat. No. 4,170,926. In such applications, a plastic piston is used to transmit a force acting as a hydraulic pressure on one end face thereof to a backing plate maintained in contact with the opposing face surface thereof. As such, the entirety of brake force is transmitted through the material of which the piston is constructed. Deformation of the piston due to the modulus of elasticity of the material the piston is constructed of can provide a deflection in the braking system. In some instances this deflection may be beneficial as it manifests itself as driver feel. However, in emergency stop conditions, the piston may be excessively deformed and/or the elastic range of deformation may be exceeded causing the brake piston to be deformed. Therefore, there is a need to provide a brake piston which is elastically deformable over a certain range of force transmissions with a structural limit of deformation present for the purpose of preventing the piston from being excessively deformed during high force brake applications.

SUMMARY OF THE PRESENT INVENTION

The present invention is a brake system having a caliper which defines a bore for slideably receiving a piston. The piston defines a surface of a hydraulic chamber at one end and generates a force in response to hydraulic pressure applied thereto. This force is then transmitted through the piston to a backing plate of a brake pad. The brake pad engages a rotor to retard rotation thereof. The piston is constructed as a vessel having a continuous circuit of sides which have an overall axial dimension. A first end of the circuit of sides is open, whereas the second end is closed defining a closed bore. The closed bore is filled with a plastic material which is bonded to the bore by virtue of the adhesive properties of the interface existing therebetween. The plastic material features a lower modulus of elasticity than that of the vessel in which it is molded. In addition, the plastic material extends axially beyond the axial dimension of the circuit of sides a predetermined dimension which is equal to the amount of deflection which occurs while the piston is transmitting a first range of forces. Upon reaching the limit of deflection of the predetermined dimension, the continuous circuit of sides engages the brake backing plate, and the combination of the continuous circuit of sides and the plastic material then conjunctively cooperate to transmit a second range of forces through the piston.

These and other aspects of the present invention will become more readily apparent by reference to the following detailed description of the embodiments as shown in the drawings.

DETAILED DESCRIPTION OF THE PREFERRED EMBODIMENT

Figure 1:
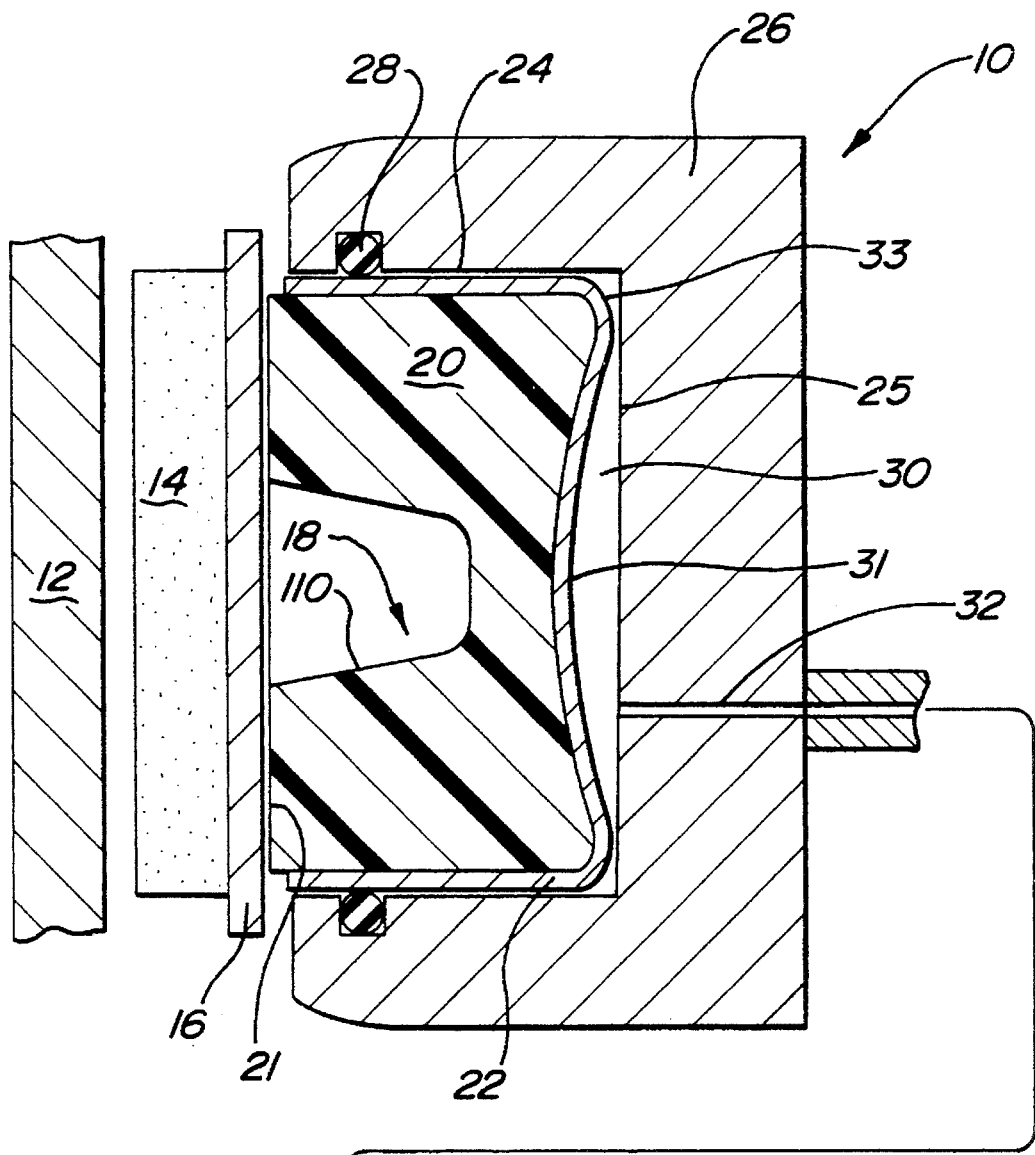
FIG. 1 is a cross-sectional view of the present invention illustrated in cross section installed in a brake assembly.
Figure 1:
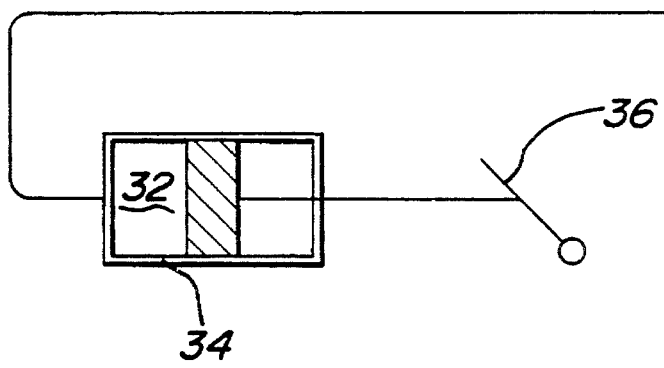

The preferred embodiment of the present invention as shown in FIG. 1 includes a brake assembly 10 featuring a rotor 12 which may rotate with a vehicle wheel contacting the road. Friction material of disc brake pad 14 engages rotor 12 to retard the rotor thereby stopping the vehicle. Composite piston 18 includes a cushion material comprising plastic 20 contained within stainless steel cup 22. In the preferred embodiment cup 22 is a thin walled structure preferably less than one millimeter in thickness. Such a structure provides ideal rigidity to satisfy the range of force transmissions anticipated in a vehicle braking system.

Bore 110 is shaped with respect to the remaining molded portion such that a void defined thereby is substantially equivalent to 14% of the total volume which is contained within cup 22. Deflection of plastic 20 may be displaced into the cavities defined by bore 110. The resulting structure consisting of plastic 20 and cup 22 transmits force in a manner which is dictated by the combination of the structural properties of the materials and the shape of the elements thereof.

Figure 2:
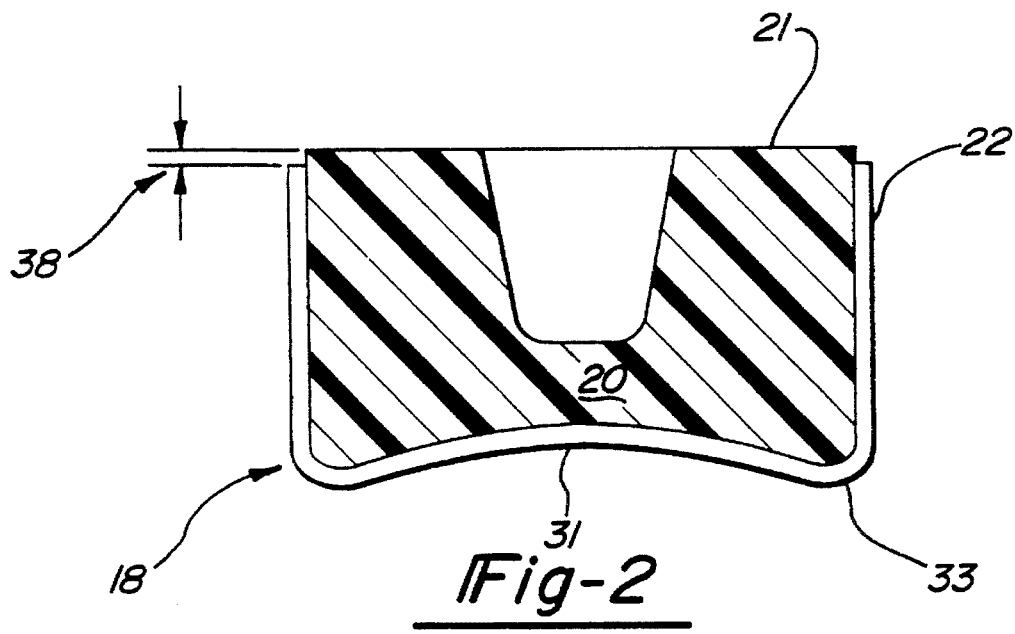
FIG. 2 is a cross-sectional view of the piston of the present invention.

Cup 22 reciprocates in bore 24 defined in caliper 26. Seal 28 provides a fluid barrier thereby defining hydraulic chamber 30 located at face portion 31 of piston 18. Hydraulic pressure may be supplied to chamber 30 by fluid connection 32 to master cylinder 34. The hydraulic pressure generated by master cylinder 34 is in response to manual application of force to pedal 36. Force transmitted from face 31 of piston 18 is transmitted through composite piston 18 portions 20, 22. As may be observed in FIG. 2, plastic 20 of piston 18 protrudes beyond cup 22 a dimension 38. Consequently, the entire force of piston 18 is initially transmitted to backing plate 16 through surface 21 of plastic 20. Plastic 20 is capable of transmitting low to moderate magnitude force through range 40 of braking operations, illustrated in the force displacement diagram of FIG. 3. In instances wherein high magnitude force transmission is necessitated, plastic 20 deflection exceeds dimension 38 and cup 22 in combination with plastic 20 thereby define a higher force transmission mode of operation through piston 18. One skilled in the art will also appreciate that initial deflections of plastic 20 will define a low to moderate magnitude force transmission property of piston 18. Dimension 38 may be sufficiently large such that the range of forces transmitted by piston 18 do not result in a deflection as great as dimension 38. In such a case the low to moderate magnitude forces transmitted by piston 18 will result in deflection of plastic 20, whereas higher force transmissions will be carried by the combined structure of the plastic 20 and cup 22. It may be observed that the normal mode of braking will occur in range 40 and will provide a range of proportionalness or pedal feel to the operator of the vehicle, whereas range 42 is for high brake force applications where pedal feel is not as sensitive a performance criteria. Piston 18 is constructed by a stamping process in which a blank is formed generally to the shape illustrated in cross section in FIG. 2 by cup 22. It may be noted that face 31 is concave extending radially outwardly into a radiused corner 33 whereupon an axially extending continuous circuit of sides extends therefrom.

Figure 3:
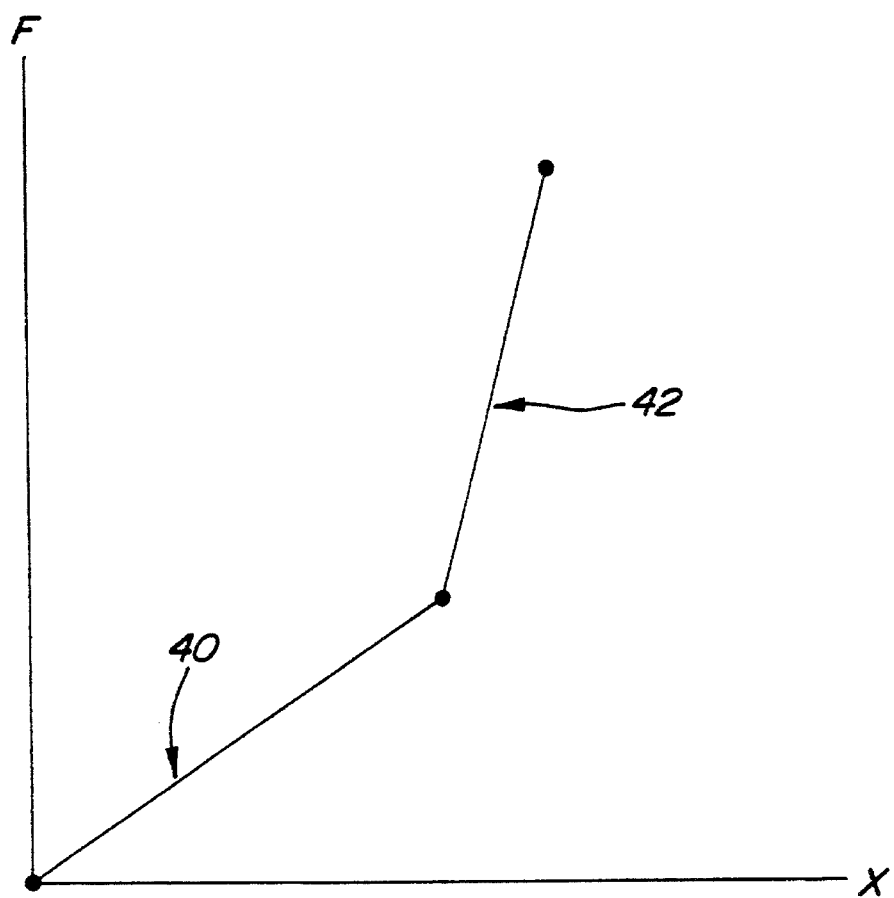
FIG. 3 is a force transmission diagram of the piston of the present invention.

The piston of the present invention may be manufactured by stamping the cup from a blank. Subsequent to the stamping operation, plastic 20 is installed by a compression molding process in which plastic 20 is molded and cured therein featuring bore 110. In the preferred embodiment of the present invention plastic 20 is Fiberite phenolic FM4029-F-1 supplied by Fiberite Corporation. Fiberite is molded in place using a compression molding press capable of providing 10,000 psi and maintaining same for a cure time of approximately fifteen minutes. A final operation constitutes a grinding operation in which the overall dimension from face portion 21 of plastic 20 extending to face portion 33 of cup 22 is ground to a predefined tolerance to define an overall dimension therebetween. The preferred embodiment of the present invention features bore 110 having a diametral dimension approximately equal to one-half the total diametral dimension. The depth of bore 110 is preferably approximately one-half the total axial dimension of piston 18. Using a 304 stainless steel cup having a diameter of approximately 3", an axial length of 2", featuring a molded phenolic insert including a bore of 1.5" diameter and a depth of 1", provides force transmission properties such as illustrated in FIG. 3. Such a piston configuration may feature a dimension 38 equal to the range 0.005 inch to 0.250 inch. A piston of such configuration utilized in a brake system during normal mode of braking, such as range 40 of FIG. 3, preferably is characterized by a modulus of elastic deflection of 6,300,000 pounds per inch. Deflections which occur in this normal mode of braking range will transmit 0–20,000 lbs. of force which is suitable for accomplishing normal mode of braking of a vehicle. A piston of such configuration utilized in a brake system having high brake force applications such as occurring in range 42 of FIG. 3 preferably is characterized by a modulus of elastic deflection of 12,200,000 pounds per inch. One skilled in the art will recognize that the higher modulus is achieved due to the conjunctive deflection of cup 22 and plastic 20. Deflection which occurs in high brake force range will transmit 20,000 lbs. of force and greater which is suitable for accomplishing high brake force mode of braking of a vehicle.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. A disc brake system for a vehicle, said system having a rotor, brake pad means, a caliper and a piston positioned in a bore in said caliper, said piston being hydraulically operated to press said brake pad means against said rotor, said improvement comprising:

said piston comprising a cup member having a central chamber and a cushion member, said cushion member having a lower modulus of elasticity than said cup member and being positioned in said central chamber, a portion of said cushion member protruding axially beyond said cup member for contacting said brake pad means, wherein upon actuation of said brake system, said piston transmits a first force against said brake pad means during a first braking operation of said vehicle, and wherein said piston transmits a second force against said brake pad means during a second braking operation of said vehicle, said cushion member contacting said brake pad means and thereby applying said first force to said brake pad means during said first braking operation, and said cup and said cushion member both contacting said brake pad means and thereby applying said second force to said brake pad means during said second braking operation, wherein said lower modulus of elasticity of said cushion member does not cause said cushion member to deflect sufficiently to allow said cup member to contact said brake pad means during said first braking operation, and wherein said lower modulus of elasticity of said cushion member does cause said cushion member to deflect sufficiently to allow said cup member to contact said brake pad means during said second braking operation.

2. The disc brake system of claim 1 wherein said brake pad means comprises a brake pad and a backing plate member.

3. The disc brake system of claim 1 wherein said cushion member has a void therein.

4. The disc brake system of claim 3 wherein said void is about 14% of the total volume of said central chamber.

5. The disc brake system of claim 3 wherein the axial dimension of said void is substantially one-half the axial dimension of said cushion member.

6. The disc brake system of claim 3 wherein said void is substantially circular in cross-section and has a diameter substantially one-half the diameter of said cushion member.

7. The disc brake system of claim 1 wherein said cup member has a concave surface.

8. The disc brake system of claim 1 wherein said cushion member is made from a plastic material, said cup member is made from a metal material, and the protrusion of said cushion member beyond said cup member is in the range from 0.005" to 0.250".

9. The disc brake system of claim 1 wherein the modulus of elasticity of said piston during said first braking operation is approximately 6,300,000 pounds per inch and the modulus of elasticity of said piston during said second braking operation is approximately 12,200,000 pounds per inch.

10. The disc brake system of claim 1 further comprising sealing means sealing said piston in said bore in said caliper.

11. The disc brake system of claim 1 wherein said cushion member is securely affixed to said cup member by bonding.

12. The disc brake system of claim 1 wherein said cup member is made from a stainless steel material and said cushion member is made from a phenolic material, and wherein said cushion member is molded into said central chamber of said cup member.

* * * * *